3,379,681
POLYMERIC COMPOSITIONS STABILIZED WITH A BIS(MONOSUBSTITUTED ALKYL)SULFONE
Adam F. Kopacki, Westwood, N.J., and Silvio L. Giolito, Whitestone, N.Y., assignors to Stauffer Chemical Company, New York, N.Y., a corporation of Delaware
No Drawing. Filed Mar. 19, 1965, Ser. No. 441,298
12 Claims. (Cl. 260—45.85)

ABSTRACT OF THE DISCLOSURE

Light stabilized polymer compositions comprising a normally solid hydrocarbon polymer formed from the polymerization of a hydrocarbon monomer containing an aliphatic group of from 2 to 10 carbon atoms and having at least one ethylenic center of unsaturation and a stabilizing quantity of a bis(monosubstituted alkyl) sulfone of the formula:

$$(R-Z-CH_2CH_2)_2SO_2$$

wherein R is selected from the class consisting of hydrocarbyl of from 1 to 20 carbon atoms, lower aliphatic acyl and $(R')_2P(S)$— wherein R' is hydrocarbyl as aforesaid and Z is an electronegative grouping selected from the class consisting of —O—, —S—, —SO— and —SO$_2$—.

---

This invention relates to the stabilization of polymeric materials against deterioration resulting from exposure to ultraviolet light and similar actinic radiation. The invention is particularly concerned with the stabilization of hydrocarbon polymers by the inclusion therein of a bis(monosubstituted alkyl)sulfone.

It is well known that plastics and polymeric materials generally are susceptible to a characteristic type of photocatalyzed degradation when exposed to sunlight or other sources of ultraviolet rays. Although the effect varies with different materials, it commonly manifests itself initially as a weakening of the tensile strength of the polymer which on continued exposure becomes increasingly brittle until a point is reached at which mechanical failure occurs. Color changes often accompany the breakdown. In extreme instances, the polymer may be transformed into a powdery mass.

Over a period of years there has been considerable research directed to remedying the inherently poor resistance of plastic materials towards ultraviolet radiation. The most familiar of these proposals consists in blending the plastic or polymer with a material which itself is a strong ultraviolet absorber. It is this latter property which apparently affords protection of the plastic from the damaging actinic radiation. In fact, it is customary to refer to the aforesaid additives as ultraviolet stabilizers. Because of their inherently poor resistance to ultraviolet light, the successful commercialization of synthetic polymers is tied in closely with the development of a suitable stabilizer.

Whereas the principal function of an ultraviolet stabilizer is that it provide protection of the polymer, certain ancillary features and characteristics are also required. It is, for instance, highly important that the stabilizer should not modify or cause adverse changes in the polymer. A particularly vexatious characteristic of many plastic additives is their tendency to impart color or stain to the polymer in which they are incorporated, ultraviolet stabilizers being peculiarly prone to this type of behavior. Such side effects cannot be tolerated where a clear or colorless polymer is needed. Even pigmented or dyed plastic materials are deleteriously affected by stabilizer staining since it causes overall color degradation. Other undesirable side effects often encountered are odor, toxicity, softening, bleeding and the like. A desideratum from the commercial standpoint is that the stabilizer be readily available or economical to manufacture.

It has now been discovered that excellent ultraviolet stabilizing of polymers can be realized without encountering the aforesaid undesirable side effects by incorporating in the polymer a bis(monosubstituted alkyl)sulfone having the following formula:

$$(R-Z-CH_2CH_2)_2SO_2$$

wherein R is a hydrocarbon residue or hydrocarbyl as it is sometimes known of from 1 to 20 carbon atoms such as alkyl of from 1 to 20 carbon atoms, e.g. methyl, ethyl, n-propyl, isobutyl, n-pentyl, isopentyl, n-hexyl, isohexyl, n-heptyl, n-octyl, isooctyl, n-nonyl, n-decyl, isodecyl, undecyl, dodecyl, tridecyl, tetradecyl, pentadecyl, hexadecyl, heptadecyl, octadecyl, nondecyl, eicosyl, etc., lower aliphatic acyl, e.g. acetyl, etc., aromatic hydrocarbyl, e.g. phenyl, naphthyl, biphenyl, etc., aralkyl hydrocarbyl, e.g. benzyl, phenethyl, gamma-phenylpropyl, etc., cycloalkyl hydrocarbyl, e.g. cyclopentyl, cyclobutyl, cyclohexyl, cycloheptyl, cyclooctyl, cyclononyl, cyclodecyl, cyclododecyl, cyclotridecyl, cylotetradeyl, cyclopentadecyl, cyclohexadecyl, cycloheptadecyl, cyclooctadecyl, cyclononadecyl, etc., and $(R')_2P(S)$—wherein R' is hydrocarbyl as as above defined and Z is an electronegative grouping as exemplified by —O—, —S—, —SO— and —SO$_2$—. Exemplary compounds falling within the ambit of the above depicted formula include the following:

(1) Bis(2-p-n-propylphenoxyethyl)sulfone
(2) Bis(2-ethylmercaptoethyl)sulfone
(3) Bis(2-o-tolyloxyethyl)sulfone
(4) Bis(2-cyclohexylmercaptoethyl)sulfone
(5) Bis(2-n-propylmercaptoethyl)sulfone
(6) Bis(2-n-hexylmercaptoethyl)sulfone
(7) Bis(2-benzylmercaptoethyl)sulfone
(8) Bis(2-phenethylmercaptoethyl)sulfone
(9) Bis(2-p-tolyloxyethyl)sulfone
(10) Bis(2-allylmercaptoethyl)sulfone
(11) Bis(2-n-pentylmercaptoethyl)sulfone
(12) Bis(2-p-biphenylyloxyethyl)sulfone The bis(monosubstituted alkyl)sulfones which are useful in practicing the invention are in general known chemical entities, the description and preparation of which can be found in the technical and chemical literature. For instance, such well known publications as Chemical Abstracts indexes numerous sulfones of the aforesaid type. A suitable procedure for obtaining the bis(monosubstituted alkyl)sulfones is described by Stahmann et al. in the JOC, page 732 (1946), in which an organic component having an active hydrogen is added to divinylsulfone. As an illustration of the reaction bis(2-octylmercaptoethyl)sulfone can be prepared in excellent yield by reacting divinylsulfone with n-octylmercaptan in an aqueous organic solvent medium using a tertiary organic amine as catalyst. The condensation proceeds readily at slightly elevated temperatures and the resulting bis(monosubstituted alkyl)sulfone is commonly isolated as a crystalline solid which can be purified in the usual manner.

In practicing the invention the bis(monosubstituted alkyl)sulfone can be blended or incorporated into the polymer by any of the conventional methods commonly used for mixing such materials with resins and plastics. A typical procedure comprises milling on heated rolls, although deposition from solvents and dry blending are other well known techniques.

In testing the stabilizers of the invention, we have found them singularly effective in protecting hydrocarbon polymeric systems such as poly-α-olefins, diolefins, copolymers of olefins or olefins and diolefins and other hydrocarbon polymers, polymers of substituted vinyl compounds against deterioration due to exposure to actinic radiation. The polymer compositions stabilized in accordance with the invention exhibit an extended life expectancy and are much more useful and practical than unstabilized polymers and possess a wide diversity of uses including out-of-door installations requiring prolonged exposure to sunlight and the elements. Moreover, the use of the herein bis(monosubstituted alkyl)sulfones, although inordinately effective as a U.V. stabilizer, does not produce any undesirable side effects. Even after accelerated exposure periods in the neighborhood of 1000 hours, test samples of polymers showed slight loss of mechanical strength while remaining substantially free of stain or coloration.

The polymers stabilized as contemplated herein can be cast, extruded, rolled or molded into sheets, rods, tubes, piping, filaments and other shaped articles including sheets or films ranging from 0.5 to 100 mil in thickness. The polymer compositions of our invention can be applied as coatings to paper, cloth, wire, metal foil and are suitable for the manufacture of synthetic fibers and fabrics. Although the quantity of stabilizer is not particularly critical, it is recommended that the concentration based on the weight of polymer be maintained in the neighborhood of 0.01 to about 5.0%.

The bis(monosubstituted alkyl)sulfones are suitable for stabilizing a wide variety of hydrocarbon polymers against deterioration caused by exposure to actinic radiation. In this connection, mention is made of any of the normally solid polymers derived from the polymerization of α-mono-olefinic, aliphatic and aryl substituted aliphatic hydrocarbons containing from 2 to 10 carbon atoms on the aliphatic chain. Typical poly-α-olefins include polyethylene, polypropylene, poly(3 - methylbutene - 1), poly(4-methylpentene-1), poly(pentene-1), poly(3,3-dimethylbutene-1), poly(4,4-dimethylbutene-1), poly(octene-1), poly(decene-1), polystyrene, polydivinylbenzene, and the like. Copolymers of such olefins as those prepared from ethylene and propylene or ethylene and the butenes or the like are also protected as are polydiolefins, i.e. polybutadiene or polyisoprene and olefin-diolefin copolymers of the type as butadiene-styrene or isobutylene-isoprene copolymers.

We have ascertained that the stabilizers of the invention are particularly useful for preventing photodegradation by ultraviolet light or sunlight of stereoregular polyolefins such as isotactic polypropylene. Isotactic polypropylene is a stereoregular polymer wherein the monomeric units are predominantly head-to-tail with the methyl groups on one side of the helical chain rather than in the more common arrangement where the methyl groups are randomly distributed on both sides of the chain. Moreover, this isotactic or singular arrangement of substituents attached to the chain promotes an orderly alignment of the molecules. Such stereoregular polymers are characterized by a high degree of crystallinity and are much superior in physical properties to atactic polymers having a random distribution of monomeric units. Stereoblock polymers wherein long segments of the chain are in one configuration or the other and also polymers with amorphous regions are also protected. For a fuller description of such polymers, reference is hereby made to the Scientific American, 197 No. 3, pages 98–104 (1957); 205 No. 2, pages 33–41 (1961). It is also to be understood that the amorphous polymers or those which are predominantly amorphous are likewise stabilized by the sulfones of the invention.

Although the molecular weight of polymers varies over wide limits, the stabilizer compounds of the invention are not restricted to any particular molecular weight range of polymer and in fact it has been our finding that excellent protection can be realized with polymers having a broad or narrow range. Furthermore, the so-called amorphous low molecular weight poly-α-olefin waxes or oils are likewise susceptible to protection by means of the herein described bis(monosubstituted alkyl)sulfones.

The following examples illustrate the procedure for preparing stabilized polymer compositions of the invention, although the inclusion of such examples is not to be taken as limiting or otherwise imposing any restriction on the invention and it is to be understood that variations in practicing the same without departing from the scope or spirit thereof will be apparent to those skilled in the art to which the said invention pertains.

Example 1

A dry blend consisting of 50 g. of isotactic polypropylene and 0.5% by weight based on the polypropylene of bis(2-octylmercaptoethyl)sulfone was subjected to compression molding in the usual manner at a temperature of 400° F. for six minutes at 2000 p.s.i. The resulting blended polymer was compression-molded or extruded into a 25 mil sheet and thereafter cut into square samples measuring two inches on a side. A like sample containing no stabilizer was prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Damage resulting from the exposure of the polypropylene was assessed with respect to change of structural strength. The exposed test sample of polymer was considered to have failed structurally when the test sheet failed the 180° flexure test. In the present instance, the use of the bis(2-octylmercaptoethyl)sulfone postponed embrittlement of the polypropylene sheet against an exposure period of 1130 hours. At the same time, there was little or no indication of surface crazing or discoloration or staining. A blank specimen of unstabilized polypropylene which was exposed concurrently with the stabilized product failed the flexure test after an exposure time in the order of 250 hours.

The Weatherometer as used in compiling the data and tests described herein was purchased from the Atlas Electric Devices Company, Chicago, Ill. The instrument is identified as a 6000 watt Xenon Arc Weatherometer, Model 60W.

The polypropylene resin as used in the above described example is an unstabilized general purpose, high molecular weight polypropylene of the isotactic or crystalline type. Typically, it has a melt index of 4 at 230° C. and a specific gravity of 0.905.

Example 2

The procedure of Example 1 was again repeated but substituting polyethylene in lieu of the polypropylene. In general, the results paralleled those obtained in the first example.

Example 3

The procedure of Example 1 was repeated except that the polypropylene was replaced by polystyrene. In general, the degree of stabilization was comparable to that obtained in the previous examples.

Using the procedure as set forth in Example 1, the following bis(monosubstituted alkyl)sulfones were tested as light stabilizers in isotactic polypropylene.

| Ex. No. | Conc. 0.5% in Polypropylene | Hours In Weatherometer | Color |
|---|---|---|---|
| 4 | Bis(2-octylsulfonylethyl)sulfone | 1,199–1,432 | None—pale yellow. |
| 5 | Bis(2-diphenylphosphinodithioethyl)sulfone. | 757–757 | None. |
| 6 | Bis(2-phenylmercaptoethyl)sulfone | 896–896 | Do. |
| 7 | Bis(2-p-nonylphenylmercaptoethyl)sulfone. | 824–824 | Do. |
| 8 | Bis(2-phenoxyethyl)sulfone | 1,040–1,040 | Pale yellow. |
| 9 | Bis(2-p-t-butylphenylmercaptoethyl)sulfone. | 1,087–1,087 | None. |
| 10 | Bis(2-acetylmercaptoethyl)sulfone | 1,061–824 / 1,061–1,124 | Do. |

We claim:
1. A light stabilized polymer composition comprising normally solid poly-α-olefin formed from the polymerization of a mono-olefinic hydrocarbon of from 2 to 10 carbon atoms and a stabilizing quantity of a bis(monosubstituted alkyl)sulfone of the formula:

$$(R-Z-CH_2CH_2)_2SO_2$$

wherein R is selected from the class consisting of hydrocarbyl of from 1 to 20 carbon atoms, lower aliphatic acyl and $(R')_2P(S)-$ wherein R' is hydrocarbyl as aforesaid and Z is an electronegative grouping selected from the class consisting of —O—, —S—, —SO— and —SO$_2$—.

2. A light stabilized composition comprising polystyrene and a stabilizing quantity of a bis(mono-substituted alkyl)sulfone of the formula:

$$(R-Z-CH_2CH_2)_2SO_2$$

wherein R is selected from the class consisting of hydrocarbyl of from 1 to 20 carbon atoms, lower aliphatic acyl and $(R')_2P(S)-$ wherein R' is hydrocarbyl as aforesaid and Z is an electro-negative grouping selected from the class consisting of —O—, —S—, —SO— and —SO$_2$—.

3. A light stabilized composition according to claim 1 wherein the normally solid poly-α-olefin is polyethylene.

4. A light stabilized polymer composition comprising polypropylene and a stabilizing quantity of a bis(monosubstituted alkyl)sulfone of the formula:

$$(R-Z-CH_2CH_2)_2SO_2$$

wherein R is selected from the class consisting of hydrocarbyl of from 1 to 20 carbon atoms, lower aliphatic acyl and $(R')_2P(S)-$ wherein R' is hydrocarbyl as aforesaid and Z is an electronegative grouping selected from the class consisting of —O—, —S—, —SO— and —SO$_2$—.

5. A composition according to claim 4 wherein the bis(monosubstituted alkyl)sulfone has the formula:

$$(C_8H_{17}SCH_2CH_2)_2SO_2$$

6. A composition according to claim 4 wherein the bis(monosubstituted alkyl)sulfone has the formula:

$$(C_8H_{17}SO_2CH_2CH_2)_2SO_2$$

7. A composition according to claim 4 wherein the bis(monosubstituted alkyl)sulfone has the formula:

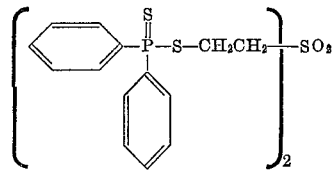

8. A composition according to claim 4 wherein the bis(monosubstituted alkyl)sulfone has the formula:

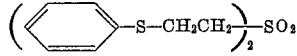

9. A composition according to claim 4 wherein the bis(monosubstituted alkyl)sulfone has the formula:

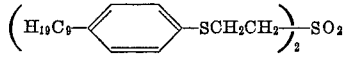

10. A composition according to claim 4 wherein the bis(monosubstituted alkyl)sulfone has the formula:

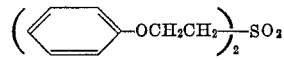

11. A composition according to claim 4 wherein the bis(monosubstituted alkyl)sulfone has the formula:

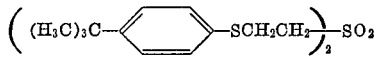

12. A composition according to claim 4 wherein the bis(monosubstituted alkyl)sulfone has the formula:

$$(CH_3COSCH_2CH_2)_2SO_2$$

References Cited

UNITED STATES PATENTS 2,677,617   5/1954   Thompson _____ 260—45.7
2,985,617   5/1961   Salyer et al. _____ 260—45.7

FOREIGN PATENTS 1,386,369   12/1964   France.

DONALD E. CZAJA, *Primary Examiner.*

M. J. WELSH, *Assistant Examiner.*